United States Patent [19]

Yang

[11] Patent Number: 4,973,100
[45] Date of Patent: Nov. 27, 1990

[54] CAR TARPAULIN COMBINATION DEVICE WITH A STORING BAG

[76] Inventor: Ming-Shun Yang, 11FL-2, No. 109, Ho Ping East Road, Sec. 3, Taipei, Taiwan

[21] Appl. No.: 367,192

[22] Filed: Jun. 16, 1989

[51] Int. Cl.⁵ ............................................. B60J 11/00
[52] U.S. Cl. .................................. 296/136; 150/166
[58] Field of Search .......................... 296/136, 38, 98; 160/370.2; 150/166

[56] References Cited

U.S. PATENT DOCUMENTS

| | | | |
|---|---|---|---|
| 1,730,733 | 10/1929 | Judd | 296/136 X |
| 2,851,303 | 9/1958 | McQueen | 160/370.2 X |
| 2,994,356 | 4/1960 | Fleming | 296/136 X |
| 4,355,839 | 10/1982 | Rosen | 150/166 |
| 4,799,728 | 1/1989 | Akers et al. | 296/136 |
| 4,821,785 | 4/1989 | Rolan | 296/136 X |
| 4,834,446 | 5/1989 | Tung-Chow | 296/136 |
| 4,844,005 | 7/1989 | Filomeno | 296/136 X |

FOREIGN PATENT DOCUMENTS

| | | | |
|---|---|---|---|
| 1074987 | 10/1954 | France | 296/136 |
| 1536637 | 8/1968 | France | 296/136 |
| 4531207 | 12/1970 | Japan | 296/136 |
| 56-8729 | 8/1980 | Japan | 296/136 |
| 74040 | 4/1947 | Norway | |

Primary Examiner—Margaret A. Focarino
Assistant Examiner—Joseph D. Pape
Attorney, Agent, or Firm—Young & Forward

[57] ABSTRACT

The present invention comprising a car tarpaulin and a storing bag, wherein a snap hole is provided to the lower edge on each of left and right sides of car tarpaulin, a snap belt is provided in keeping with the snap hole, a removable wheel cover for covering the tire is provided to the car tarpaulin corresponding to each of the positions of four car wheels, the storing bag is an equipment for containing the tarpaulin, a rectangular hole is provided to the annular lateral side of the storing bag, and the bag is provided with a receptacle to engage with a water collecting bottle.

3 Claims, 5 Drawing Sheets

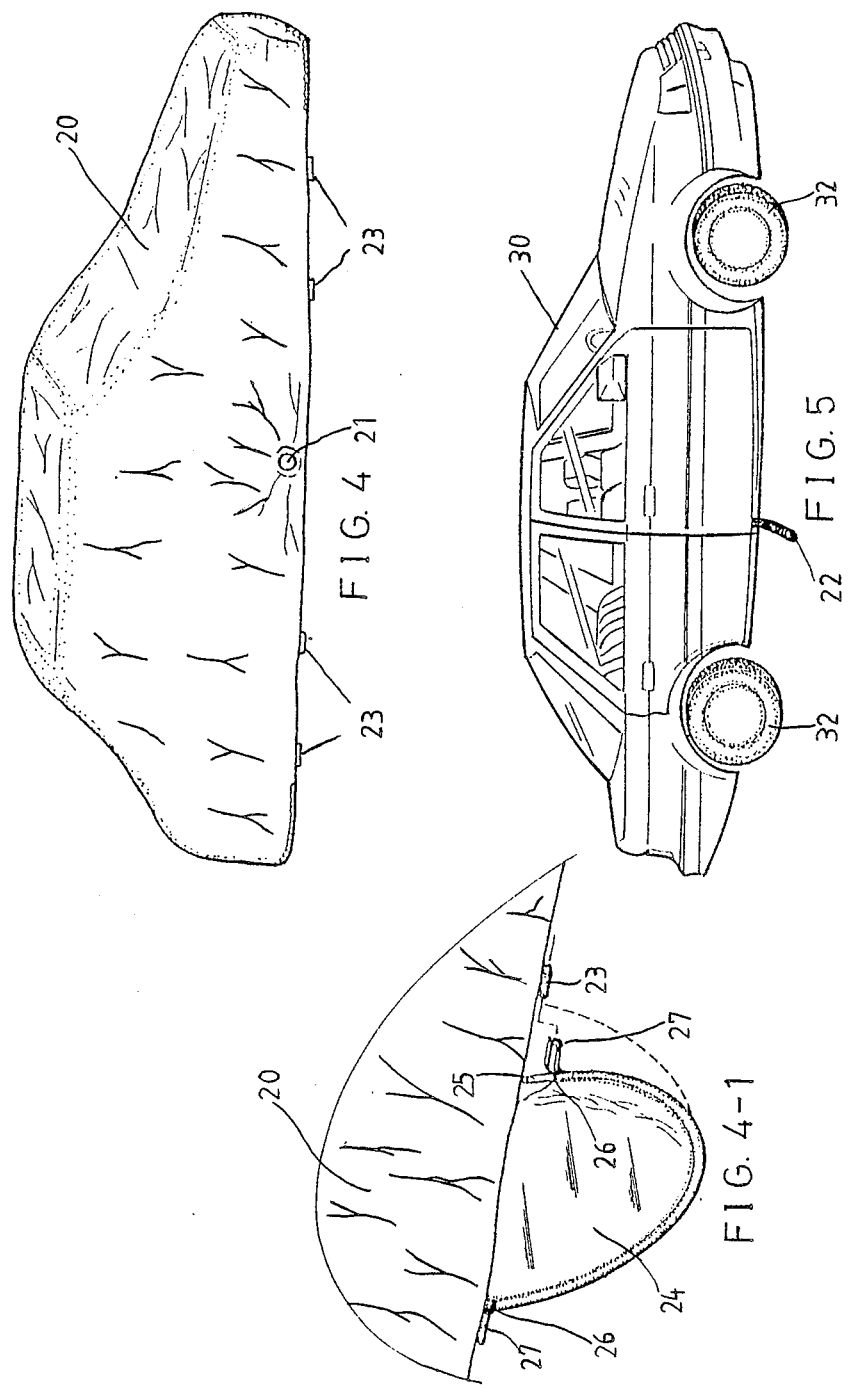

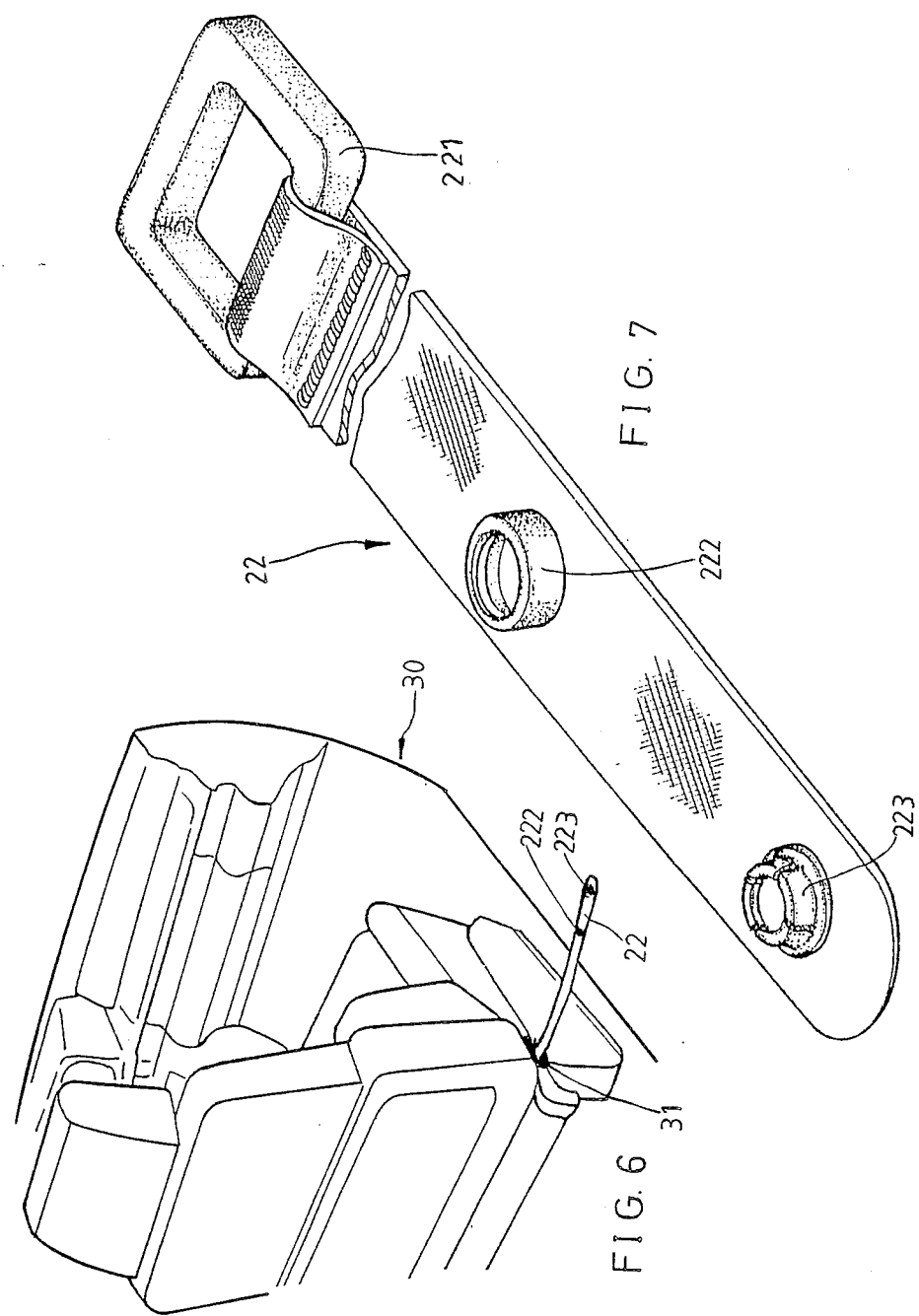

CAR TARPAULIN COMBINATION DEVICE WITH A STORING BAG

BACKGROUND OF THE INVENTION

A car tarpaulin is primarily aimed at dustproofness, waterproofness and sunproofness. A tarpualin is instrumental to the maintenance of car, and really a necessary piece of equipment for the car. The conventional car tarpaulin is only designed to cover the car for dustproofness and sunproofness but cannot achieve the purpose of completely protecting the car; accordingly the function of a car tarpaulin is rather limited. Generally speaking, the conventional car tarpaulin has the following drawbacks:

1. In case of being blown by strong winds, the car tarpaulin tends to be overthrown, thereby becoming disengaged from the car and falling down on the ground.

2. Only the vehicle body can be covered while the four wheels of the car are exposed to the elements; accordingly under rainy conditions these wheels are inevitably wetted by the rain water, and the rims of tires will be corroded since these wheels cannot be covered by the car tarpaulin. Additionally, wandering dogs will frequently urinate on the tires causing the wheel rims to be acidified and corroded by the acid and urine.

3. The car cannot be used until the car tarpaulin is removed from the car and stored; rain water is inevitably adhered to the car tarpaulin if it is used under rainy conditions. In many instances, the car owner disposes the wet tarpaulin in the car trunk at random. Since the bottom of car trunk is paved with rug whereon some food, clothes or spare tires are disposed, the rug will be wetted for absorbing the rain water in quantities adhered to the tarpaulin which is disposed on the rug, and therefore the food or clothes will be also wetted at the same time by the rain water to generate odors. Furthermore, as a result of rain water vaporization, the steam thereof will gradually mildew the interior decoration of car such as the seat cushion made of flannel or leather, the ceiling of car, and the rug, audiophile equipment, etc. in the car.

In view of the above, the conventional car tarpaulin cannot meet with the car owner's demand for protecting his or her car. Therefore, the present inventor has developed a car tarpaulin combination device with a storing bag which the car owner can use to entirely and firmly cover the car, whereby strong winds cannot blow the tarpaulin down to the ground; the tarpaulin is designed so that both tires and their rims are protected against rain, etc. In addition, when disposing the tarpaulin in the car trunk after using the tarpaulin in rainy days, it may be stored in a storing bag of the present invention so as to collect the rain water adhered to the tarpaulin and prevent the rain water from leaking out from the storing bag. Therefore, the rug paved on the bottom of car trunk as well as some articles and decoration thereon or therein will not be wetted by the rain water.

SUMMARY OF THE INVENTION:

The car tarpaulin combination device with a storing bag of the present invention is chiefly characterized in the following: it consists of a car tarpaulin and a storing bag; a snap hole is provided to the lower edge on each of left and right sides of car tarpaulin, and a snap belt is provided in keeping with the snap hole; a removable wheel cover for covering the tire is provided to the car tarpaulin corresponding to each of the positions of four car wheels; the storing bag is an equipment for containing the tarpaulin, a rectangular hole is provided to the annular lateral side of the bag, and the bottom of bag is provided with a receptacle to engage with a water collecting bottle. Therefore, the car tarpaulin combination device with a storing bag of the present invention can provide the car owner with a novel car tarpaulin to achieve the following purposes: dustproofness, sunproofness and waterproofness of vehicle body, to prevent wandering dogs from urinating onto the tires of the car, to prevent the articles such as rug, food, interior decoration in the car trunk from being wetted by means of collecting the rain water in quantities adhered to the car tarpaulin, and to protect the interior and exterior of a car as a whole.

BRIEF DESCRIPTION OF THE DRAWINGS:

FIG. 2-1 shows a car tarpaulin of the present invention covering the vehicle body.

FIG. 2-2 shows a car tarpaulin of the present invention disposed in the storing bag in the car trunk.

FIG. 3-1 is a partial sectional view taken through the FIG. 3 storing bag of the present invention.

FIG. 4 is a side elevational appearance view of a car tarpaulin of the present invention.

FIG. 4-1 is a side elevational view of removable wheel cover combined with car tarpaulin of the present invention.

FIG. 5 shows a snap belt of the present invention extending out to the outside of vehicle body.

FIG. 6 is a perspective view of a snap belt of the present invention engaging with the front seat yoke of a car.

FIG. 7 is a perspective view of a snap belt of the present invention.

Figure 1:
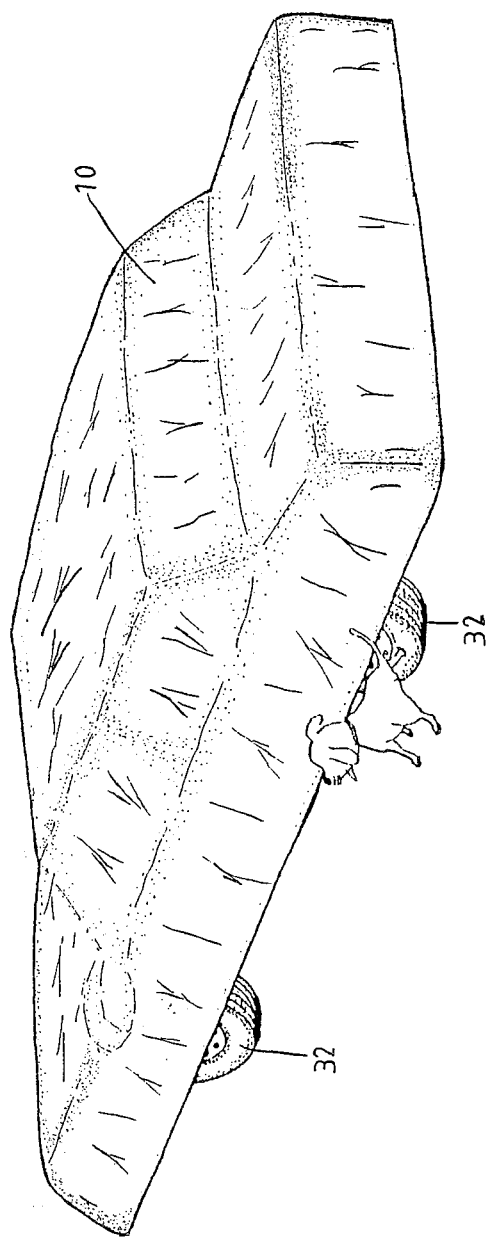
FIG. 1 is a perspective view of conventional car tarpaulin with drawbacks.

DETAILED DESCRIPTION:

As shown in FIG. 1, the conventional car tarpaulin (10) for covering the vehicle body can only achieve the purpose of dustproofness, sunproofness and waterproofness. However, during rainy days, to remove the tarpaulin(10) from the car and dispose it in the car trunk will inevitably bring the rain water in quantities in the car trunk, and the articles in the car trunk such as rug and food or decoration will be wetted by the rain water, and the conventional car tarpaulin(10) cannot entirely protect the tire(11), so the wandering dogs may optionally urinate onto the tire(11), both tire(11) and rim thereof will be damaged; in addition, in case of confronting with the strong wind, the tarpaulin(10) tends to be overthrown by the strong wind so as to fall down to the ground. The foregoing drawbacks of conventional car tarpaulin(10) are overcome through the present invention.

Figure 2:
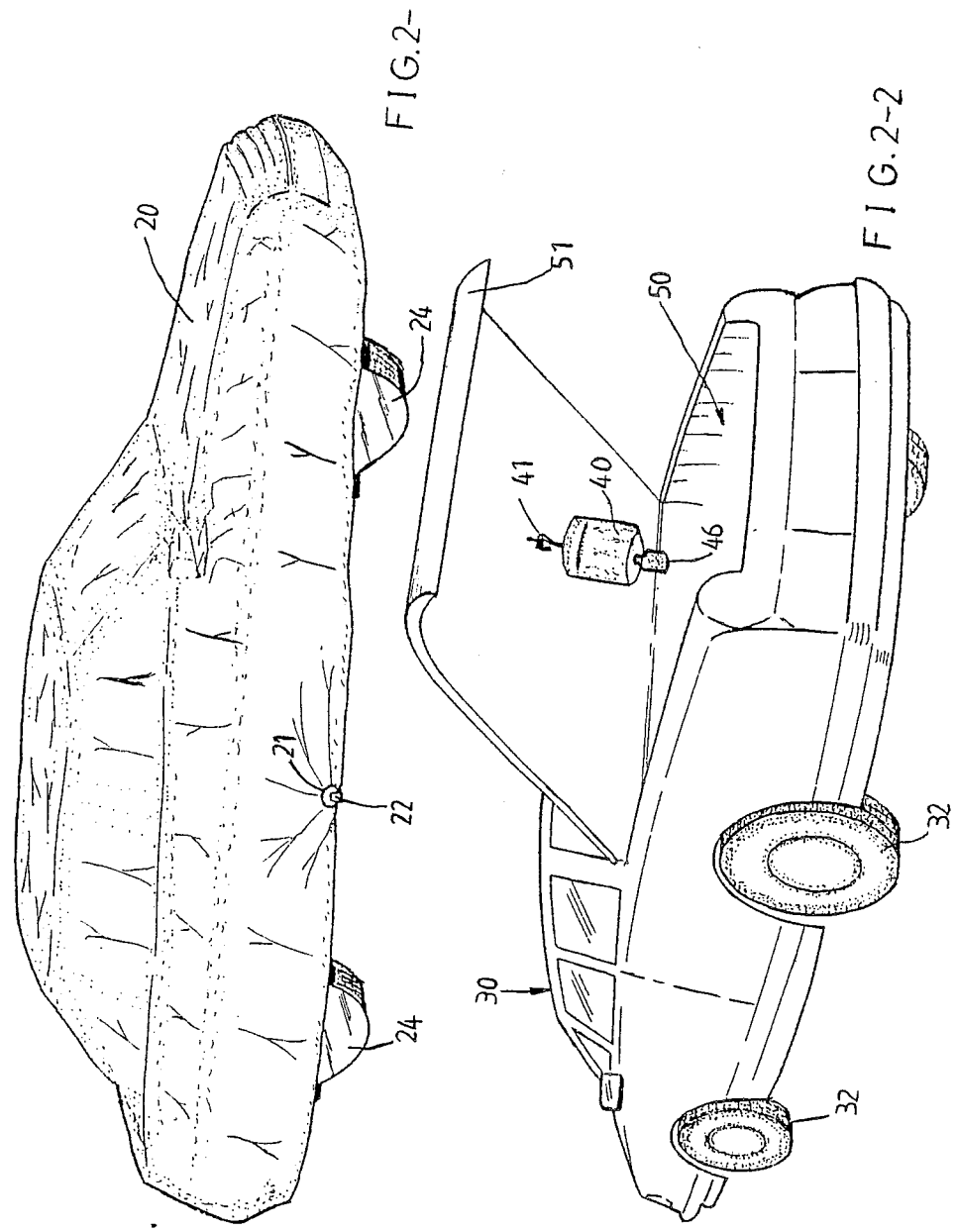

As shown in FIG. 2-1 and 2-2, when a car(30) is well parked, the car tarpaulin(20) of the present invention is used to cover the car (30) for dustproofness, sunproofness and waterproofness of the car(30); when it is desired to use the car(30), the car tarpaulin(20) can be removed from the car(30) and stored in a storing bag(40) of the present invention; the storing bag(40) is preset in a suitable position on the cover(51) of car trunk(50).

As shown in FIG. 2-1 and 4, a snap hole(21) is provided near the lower edge on each of left and right side panels of car tarpaulin(20). As shown in FIG. 5, 6 and 7, the snap hole(21) is designed to catch a snap belt(22); one end of the snap belt(22) is provided with a ring(221), and another and thereof is provided with a female snap(222) and a male snap(223). The snap belt(22) can be engaged with the front seat yoke(31) (skeleton) of car(30) and then inserted through the ring(221) as shown in FIG. 6. In the course of driving the car ahead, the snap belt(22) may be kept behind the front seat; When the car(30) is covered with the car tarpaulin(20), the snap belt(22) extends out to the outside of car(30) as shown in FIG. 6 and through the snap hole(21) on the car tarpaulin(20); The male snap(223) is pressed into the female snap(222) so that the car tarpaulin(20) can be firmly fixed on the car(30) as shown in FIG. 2-1 to prevent the tarpaulin(20) from being overthrown by strong winds.

As shown in FIG. 4 and 4-1, two pins(23) are provided on the lower edge of car tarpaulin(20) corresponding to positions of the four wheels(32) for installing a removable wheel cover(24) which is approximately semi-circular and made of thicker and heavier rubber or soft plastic, a through hole(26) is provided to the embowed peripheral edge of removable wheel cover(24) for receiving a free hose(25). A U-shaped thimble(27) is provided to the outlet at the upper end of through hole(26) so as to engage with the pins(23) on the car tarpaulin(20) which is thus engaged with the removable wheel cover(24). Since the wheel cover(24) and free hose(25) are made of soft and highly plastic material, one pin(23) can be inserted in one end of U-shaped thimble(27), and then both the wheel cover(24) and the free hose(25) can be bent so as to insert another pin(23) in another end of U-shaped thimble(27) smoothly. Finally both the wheel cover(24) and the free hose(25) are adjusted to restore their original shape so that the wheels can be covered by the wheel covers(24) which can be fixed on the car tarpaulin(20). The tires and rims thereof can be entirely covered by the wheel covers(24) so as to prevent rain water from splashing on the tires and rims thereof or wandering dogs from urinating on the tires. Covers 24 protect the tires and rims from being polluted and damaged; the wheel covers(24) can be conveniently removed from the wheels for storage when not in use.

Figures 1, 3:
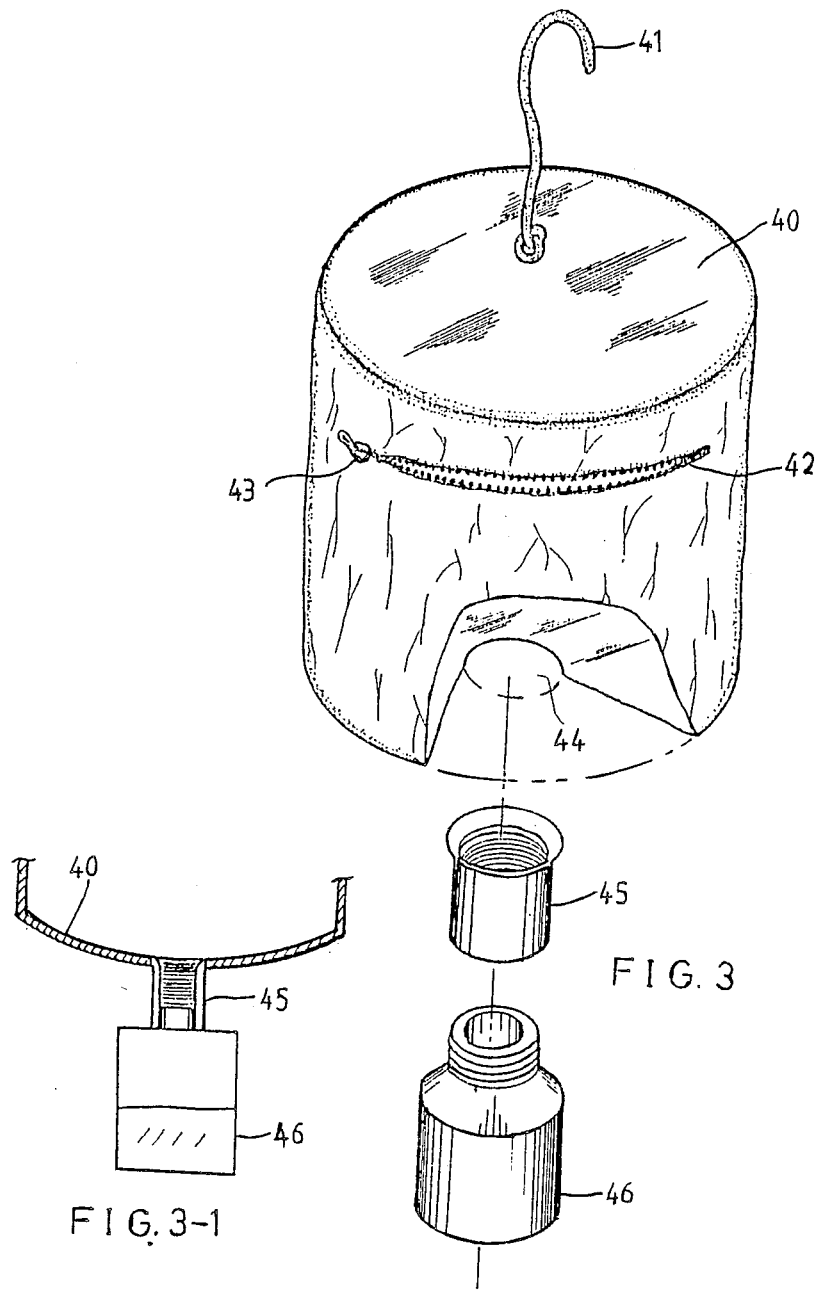
FIG. 3 is an exploded view of a storing bag for a car tarpaulin of the present invention.

As shown in FIG. 2-2, 3 and 3-1, the storing bag(40) provided to the car tarpaulin(20) of the present invention is made of a waterproof cloth and closely molded with high frequency wave so that the storing bag(40) is water-tight. A hook(41) provided to the top of storing bag(40) can be hanged in a suitable position on the cover(51) of car trunk(50); a rectangular hole(42) provided to the annular lateral side of storing bag(40) is provided with a zipper(43), so when the car tarpaulin(20) is put in the storing bag(40) through the rectangular hole(42), the zipper(43) may be pulled to close the bag(43) tightly in order to prevent the rain water adhered to the the car tarpaulin(20) from leaking out from the storing bag(40). A water outlet port(44) in the bottom of storing bag(40) communicates with a tubular fitting (45) which is attached to the bag bottom wall by high frequency wave molding. Fitting(45) is engageable with a water collecting bottle(46).

When the water collecting bottle(46) is assembled with the storing bag(40), the interior of storing bag(40) as a whole forms a closed waterproof bag. During use of the present invention in raining days, the car owner may dispose the car tarpaulin(20) with the rain water in quantities adhered to the car tarpaulin(20) in the storing bag(40). The car owner pull the zipper(43) to close the storing bag(40) so that the rain water on the car tarpaulin(20) may not leak out from the storing bag(40). and then hang the storing bag(40) in a suitable position on the lid or cover(51) of car trunk(50) through the hook(41). Therefore the rain water on the car tarpaulin(20) may gradually and slowly drop into the water collecting bottle(46) through the vibration of car driving ahead and the gravity of storing bag(40) itself. The water will never leak out from the storing bag(40) to wet the rug and other articles in the car trunk so that the decoration in the car will never be damaged, the food and clothes in the car trunk will never be polluted, and the air quality in the car will never be deteriorated, and meantime, the purpose of storing the car tarpaulin can be easily achieved. Hence the storing bag(40) provided to the car tarpaulin(20) adds to the usefulness of the car tarpaulin(20) in practice. In addition, when the water collecting bottle(46) collects enough rain water, the water may be removed by pouring out the rain water for continued use of the bottle next time.

In view of the above, when it is desired to use the car tarpaulin combination device with a storing bag, the car may be covered by the tarpaulin which maybe secured to the car without disengagement therefrom; even the wheels of car may be covered to develop the maximum effectiveness of the present invention, during periods of non use the car tarpaulin may be disposed in the storing bag to collect the rain water in quantities adhered to the tarpaulin in raining days; therefore, the present invention really can offer the car owner a novel car tarpaulin assembly which is much more practical than the conventional ones.

I claim:

1. In combination, a car tarpaulin (20), a tarpaulin storage bag (40), and a water collection container (46);
    said tarpaulin being formed of a flexible material that is positionable to fit over and around an automobile, said flexible tarpaulin material comprising flexible side panels that are extendable downwardly along side surfaces of an automobile located within the tarpaulin, each flexible side panel having a hole (21) therein near a lower edge thereof, a flexible belt (22) is detachably connectable with each said hole, each said flexible belt being extendable from the associated tarpaulin side panel through a door opening of an associated automobile so that when the automobile door is closed the tarpaulin is anchored to the automobile, two pair of attachment pins (23) are carried on the lower edge of each flexible side panel, each pair of pins being located in proximity to one wheel of an automobile when the tarpaulin is installed thereon, a wheel cover (24) having removable connections with each pair of attachment pins whereby each wheel cover can extend downwardly from the lower edge of a tarpaulin side panel to protect the associated automobile wheel from the weather elements;
    said storage bag (40) comprising an openable water-tight enclosure having a top wall, a bottom wall, and a side wall; a bag-suspension means (41) extending from the bag top wall for hanging the bag within the trunk (50) of an automobile when the trunk lid is in a closed position; and a water drainage port means (44,45) in said bottom wall;

said water collection container (46) being detachably connected to the bag bottom wall directly below said water drainage port means; said water collection container having an upwardly opening mouth for receiving water from the associated port means;

said bag being sized to receive the tarpaulin in a stored folded condition; said water collection container being removable from the bag for pouring away water that has drained from the stored tarpaulin while the bag was suspended within the trunk of an automobile.

2. The combination of claim 1, wherein each said flexible belt (22) has a ring means (221) at one end thereof to anchor the belt to an automobile seat; each said flexible belt further having a female snap fastener means (222) and a male snap fastener means (223) spaced therealong near the other end of the belt, whereby each said belt can be extended through an associated hole (21) in a tarpaulin side panel and looped back on itself to interlock the two snap fastener means together.

3. The combination of claim 1, wherein each wheel cover (24) comprises a flexible wall having a lower edge and two side edges, a hollow flexible hose (25) extending along the lower edge and side edges of said flexible wall, and a thimble structure (27) extending outwardly from each side edge of said flexible wall in near proximity to an end portion of the associated flexible hose; each thimble structure having an upwardly facing U-cross section conforming to the surface contour of the associated flexible hose;

end portions of each hose being manually turnable onto an associated thimble structure for insertion onto the attachment pins (23) carried on the tarpaulin side panels.

* * * * *